US011178521B1

(12) United States Patent
Roth et al.

(10) Patent No.: US 11,178,521 B1
(45) Date of Patent: Nov. 16, 2021

(54) MESSAGE DISPATCH SYSTEM FOR TELECOMMUNICATIONS NETWORK

(71) Applicant: UIPCO, LLC, San Antonio, TX (US)

(72) Inventors: Valerie Ann Roth, San Antonio, TX (US); Charise Renee Whitaker, San Antonio, TX (US); Oscar Guerra, San Antonio, TX (US); Ashley Raine Philbrick, San Antonio, TX (US); Paula Ann Whittington, Helotes, TX (US); Kelly Q. Baker, San Antonio, TX (US); Will Kerns Maney, Jr., San Antonio, TX (US); Sumita T. Jonak, San Antonio, TX (US); Pragya Kamal, Phoenix, AZ (US); Soon Fatt Hoo, Fair Oaks Ranch, TX (US); Ryan Thomas Russell, San Antonio, TX (US); Joel S. Hartshorn, Liberty Lake, WA (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/727,997

(22) Filed: Dec. 27, 2019

(51) Int. Cl.
*H04W 4/12* (2009.01)
*H04L 12/58* (2006.01)
*H04W 12/06* (2021.01)
*H04M 3/533* (2006.01)

(52) U.S. Cl.
CPC .............. *H04W 4/12* (2013.01); *H04L 51/066* (2013.01); *H04L 51/36* (2013.01); *H04L 51/38* (2013.01); *H04M 3/533* (2013.01); *H04W 12/06* (2013.01)

(58) Field of Classification Search
CPC ........ H04W 4/12; H04W 12/06; H04L 51/38; H04L 51/066; H04L 51/36; H04M 3/533
USPC ........................................................ 709/206
See application file for complete search history.

(56) References Cited

U.S. PATENT DOCUMENTS

| 8,238,526 | B1* | 8/2012 | Seth ................... H04M 3/533 379/88.11 |
| 10,178,230 | B1* | 1/2019 | Seay ................. H04M 3/42382 |
| 2003/0120805 | A1* | 6/2003 | Couts ..................... H04L 67/14 709/238 |
| 2004/0223598 | A1* | 11/2004 | Spiridellis ......... H04M 3/53366 379/201.01 |
| 2005/0207557 | A1* | 9/2005 | Dolan .................. H04M 15/06 379/210.02 |
| 2007/0118603 | A1* | 5/2007 | Washburn ........... H04L 12/1859 709/206 |

(Continued)

*Primary Examiner* — Chris Parry
*Assistant Examiner* — Weiwei Y Stiltner
(74) *Attorney, Agent, or Firm* — Plumsea Law Group, LLC

(57) ABSTRACT

A system and method for dispatching messages from a user to at least one recipient over a telecommunications network is disclosed. The system includes a messaging system and an authentication system. The messaging system receives user messages, retrieves contact information for recipients on a user's contact list, and attempts to deliver messages to recipients on the list. The system may continue attempting to deliver messages to recipients until it finds a recipient who is available to receive the message. The authentication system is used to ensure the recipient is a person and not a machine. The messages could be audio messages delivered using a telephone network or messages delivered over an SMS network.

20 Claims, 12 Drawing Sheets

(56) References Cited

U.S. PATENT DOCUMENTS

| | | | |
|---|---|---|---|
| 2011/0013756 A1* | 1/2011 | Davies | G10L 15/22 379/88.14 |
| 2013/0322613 A1* | 12/2013 | Clayton | H04M 3/4935 379/202.01 |
| 2015/0149560 A1* | 5/2015 | Lee | H04L 51/066 709/206 |
| 2016/0150081 A1* | 5/2016 | Shivashankaraiah | H04M 1/724 455/564 |
| 2016/0156782 A1* | 6/2016 | Mumick | H04W 4/14 455/413 |
| 2018/0176362 A1* | 6/2018 | Cohen | H04W 4/029 |
| 2020/0135005 A1* | 4/2020 | Katz | G08B 19/00 |
| 2020/0211583 A1* | 7/2020 | Kim | H04M 3/5158 |
| 2021/0176198 A1* | 6/2021 | Cudak | H04L 51/34 |

* cited by examiner

MESSAGE DISPATCH SYSTEM FOR TELECOMMUNICATIONS NETWORK

TECHNICAL FIELD

The present disclosure generally relates to telecommunications, and specifically to systems for dispatching messages over telecommunications networks.

BACKGROUND

Telecommunication networks allow users to send messages over the phone, using SMS, email and/or via other modes of communication. Even when a recipient is unavailable, messages can be left in the form of voicemail and/or texts that can be listened to or viewed by the recipient at a later time. However, in some circumstances a user may need to ensure that a message is delivered directly to a recipient who can listen to and/or read a message right away, rather than at a later time. For example, the user may need a ride home. As another example, the user may be traveling abroad and may need funds transferred to his or her account. As still another example, the user may have been arrested and in need of someone to post bail. In some circumstances, the user may not be able to repeatedly call parents or other friends or family until they reach a recipient. This may happen, for example, if the user's cell phone battery is very low, if they only have enough change to make one phone call at a pay phone, or if they are only allowed one phone call from jail. In these situations, conventional messaging systems used in conjunction with telecommunications networks are not sufficient to ensure that a recipient will receive the user's message in an adequate time frame, or that the message won't simply be overlooked or ignored.

There is a need in the art for a system and method that addresses the shortcomings discussed above.

SUMMARY

In one aspect, a method of sending audio messages over a telecommunications network includes the steps of receiving a call from a user, requesting user identification information from the user, receiving the requested user identification information from the user, recording an audio message from the user, retrieving a list of contacts associated with the user identification information, automatically calling a first recipient from the list of contacts, determining that the first recipient is not available to receive the audio message, automatically calling a second recipient from the list of contacts, and delivering the audio message to the second recipient when the second recipient is available to receive the audio message.

In another aspect, a method of sending messages over a telecommunications network includes steps of receiving a message from a user, where the message includes user identification information, and text. The method also includes steps of retrieving a list of contacts associated with the user identification information, automatically sending a first preliminary message to a first recipient from the list of contacts, determining that the first recipient is not available to view the digital message, automatically sending a second preliminary message to a second recipient from the list of contacts, and delivering the digital message to the second recipient when the second recipient is available to view the message.

In another aspect, a message dispatch system for delivering messages to users over a telecommunications network includes a device processor and a non-transitory computer readable medium storing instructions that are executable by the device processor to implement a messaging module that can automatically dispatch a user supplied message to recipients in a user's contact list, and an authentication module that can automatically determine if a recipient is available to receive the user supplied message.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide a system and method for dispatching messages from a user to at least one recipient over a telecommunications network. More specifically, the embodiments provide a system and method that ensures urgent messages are dispatched to at least one available recipient in situations where a user is only able to make one phone call (or send one digital message). The system further helps ensure dispatched messages are listened to and/or viewed at the time the message is sent, rather than relying on voicemail, email or text messages that may be stored for later viewing by a recipient. The system includes a messaging system and an authentication system. The messaging system receives user messages, retrieves contact information for recipients on a user's contact list, and attempts to deliver messages to recipients on the list. The system may continue attempting to deliver messages to recipients until it finds a recipient who is available to receive the message. The authentication system is used to ensure the recipient is a person and not a machine (either an answering machine/ voicemail system or another system that passively receives messages on behalf of a recipient).

The exemplary system can be used for a variety of different messages sent over a variety of different telecommunications networks. For example, messages could comprise audio messages (voice messages), text messages (or any short message service messages), or other kinds of digital messages. If SMS based messages are used, the messages may also incorporate any kind of multimedia, such as images, videos, audio, or other kinds of multimedia. To facilitate communication, messages can be delivered over any kinds of telecommunications networks. These include, but are not limited to: telephone networks, computer networks, the Internet, as well as any other suitable kind of telecommunications network.

Using the exemplary systems and methods, a user need only make a single call (or send a single text) to ensure an urgent message is delivered to at least one available recipient in a network of user contacts. This has the effect of saving the user time, money (in the form of calling or texting charges) while also providing peace of mind in situations where a user can only communicate for a limited time (for example, from a payphone). Moreover, the exemplary systems greatly reduce or eliminate the chances that an urgent message will be missed or ignored by all potential recipients by authenticating that a call or text has been received by a person and not a machine.

Figure 1:
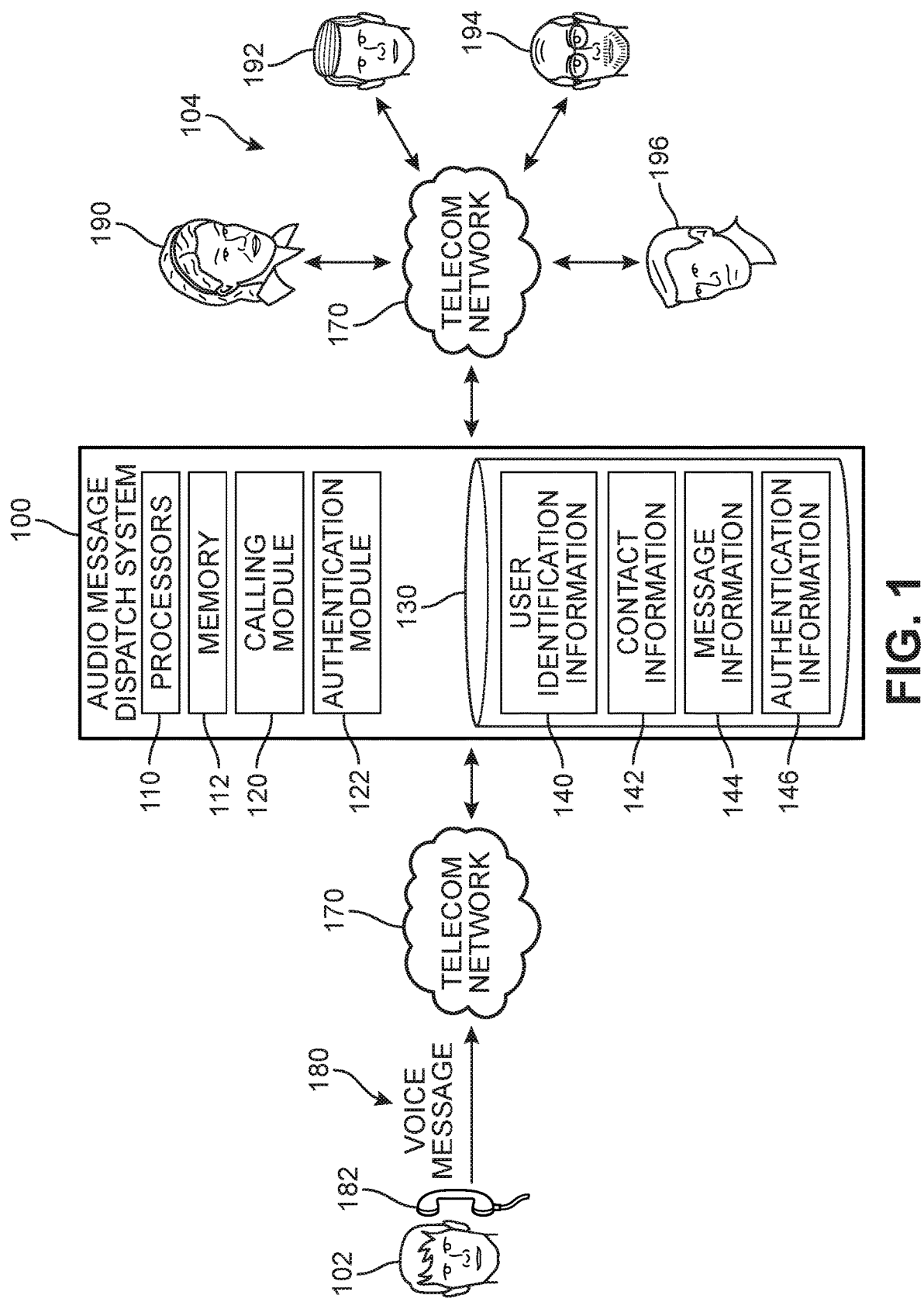
FIG. 1 is a schematic view of an audio message dispatch system, according to an embodiment.

FIG. 1 is a schematic view of an audio message dispatch system 100, which is in communication with a user 102 and a network of message recipients 104. Audio message dispatch system 100, also referred to simply as dispatch system 100, may comprise one or more computing systems including processors 110 and memory 112. Memory 112 may comprise a non-transitory computer readable medium. Instructions stored within memory 112 may be executed by the one or more processors 110. As one example, dispatch system 100 may comprise one or more servers running in the cloud.

Dispatch system 100 is further comprised of a calling module 120 and an authentication module 122. Additionally, dispatch system 100 includes data storage 130, which may be part of memory 112. In other cases, data storage 130 could be associated with a separate database.

Calling module 120 may be configured to receive calls from a user and make calls to one or more recipients. In addition, calling module 120 may be configured to receive and store various kinds of information. For each user of the system, calling module 120 stores user identification information 140. User identification information can include a user's name, a user ID, a user's phone number, or any other suitable personally identifying information. Associated with each user of the system is a list of contacts, which may be stored as contact information 142.

Calling module 120 may also store message information 144. Message information may include audio messages left by a user of the system. Audio messages may be stored in any suitable format that can be played back when dispatch system 100 has reached someone on the user's list of contacts.

Authentication module 122 is configured to authenticate that the recipient of a message is a person and not a machine (such as an answering machine/voicemail system, or any other automated system for receiving messages). In some cases, authentication module 122 may further include provisions for ensuring that a message is not only received, but also listened to by the recipient.

Authentication module 122 may use one or more kinds of authentication information 146, which may be stored in data storage 130. Authentication information 146 can include any suitable information used by dispatch system 100 to determine that the recipient of a call is a person. In some cases, authentication information 146 includes information pertaining to one or more kinds of challenge-response tasks that may be performed by authentication module 122 to determine if the recipient is a person rather than a machine.

As seen in FIG. 1, dispatch system 100 receives an incoming message from user 102. In this case, user 102 is at a payphone 182. User 102 may call a number associated with dispatch system 100 via telecommunications network 170. Once connected to dispatch system 100, user 102 may leave a voice message 180 with dispatch system 100. In some cases, user 102 may also provide user identification information so that dispatch system 100 knows which user is leaving a message and, thus, which network of recipients should be contacted.

FIG. 1 also depicts a network of recipients 104 for the exemplary user 102. This includes a set of contacts whom user 102 has identified beforehand as suitable contacts to receive messages. In this example, the contacts include a first recipient 190 (the user's mother), a second recipient 192 (the user's father), a third recipient 194 (the user's grandfather), and a fourth recipient 196 (the user's friend). Upon receiving a message from user 102, dispatch system 100 may begin calling these recipients (using telecommunications network 170) until an available recipient is found, as described in further detail below.

Figure 2:
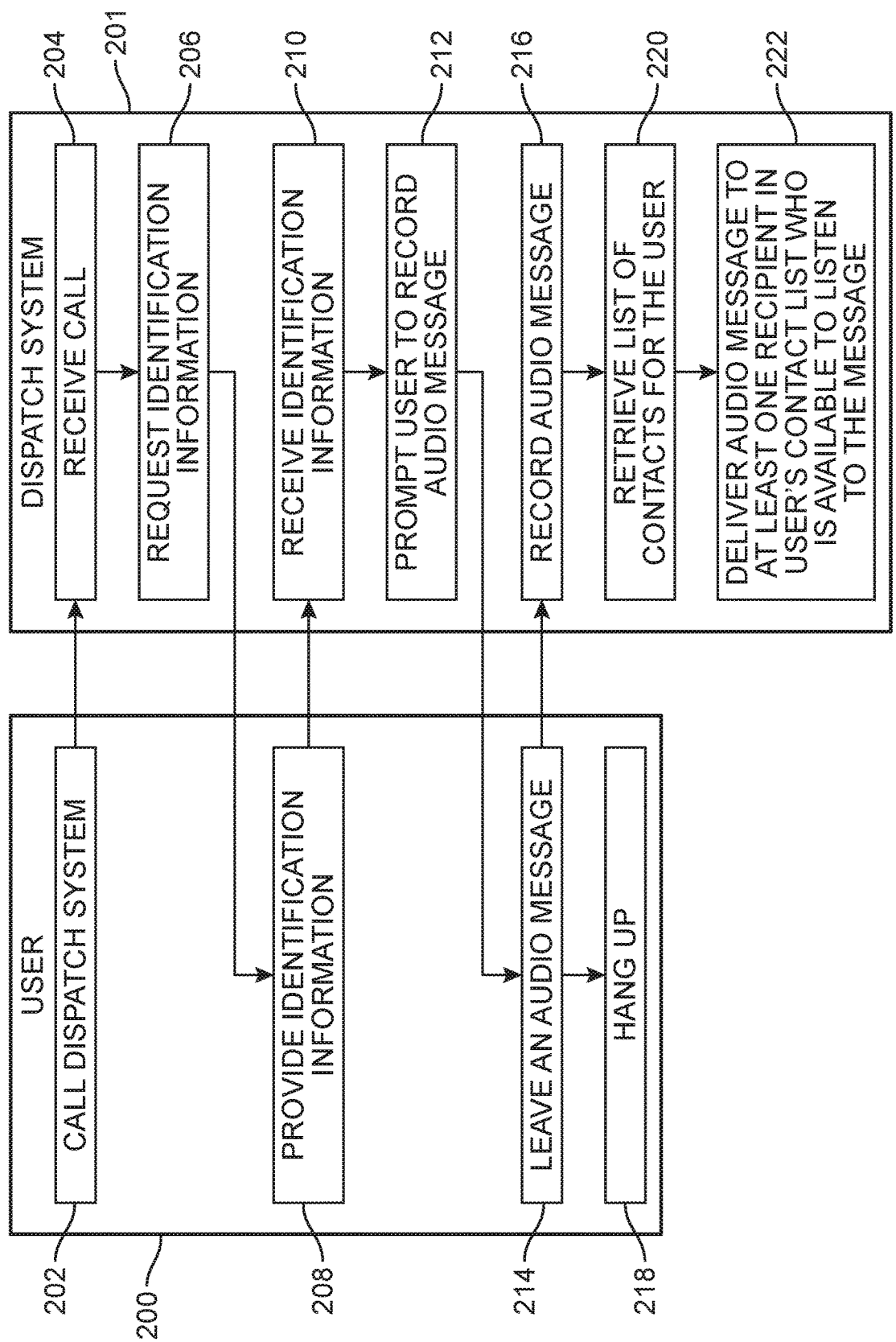
FIG. 2 is a schematic view of a process of dispatching an audio message from a user to at least on recipient in a network of contacts, according to an embodiment.

FIG. 2 is a schematic view of a process of operating an audio message dispatch system, according to an embodiment. As indicated in FIG. 2, some of the steps in this process may be performed by the user of the system (user 200), while other steps may be performed by the dispatch system (dispatch system 201).

Starting in step 202, a user 200 may call dispatch system 201. Dispatch system 201 receives the call in step 204. In some cases, dispatch system 201 may request identification information from the user in step 206. In step 208, user 200 may provide identification information including a name, ID number or any other suitable information that can be used by dispatch system 201 to identify the user and the associated list of contacts.

In step 210, dispatch system 201 receives identification information from the user and then prompts user 200 to record an audio message in step 212. User 200 may leave an audio message in step 214 in response to this prompt. As user 200 is leaving the audio message, it may be recorded by dispatch system 201 in step 216.

Once the user has left his or her message, the user may hang up in step 218. At this point, there is no further action that must be taken by the user since dispatch system is able to automatically dispatch the recorded audio message to at least one recipient on the user's contact list who is currently available.

In step 220, dispatch system 201 retrieves a list of contacts for user 200. In some cases, dispatch system 201 uses the identification information received in step 210 to lookup the user and their associated contact list. This information may include, for example, phone numbers for each contact. In step 222, dispatch system 201 attempts to deliver the audio message to at least one recipient in the user's contact list who is currently available to listen to the message.

Figure 3:
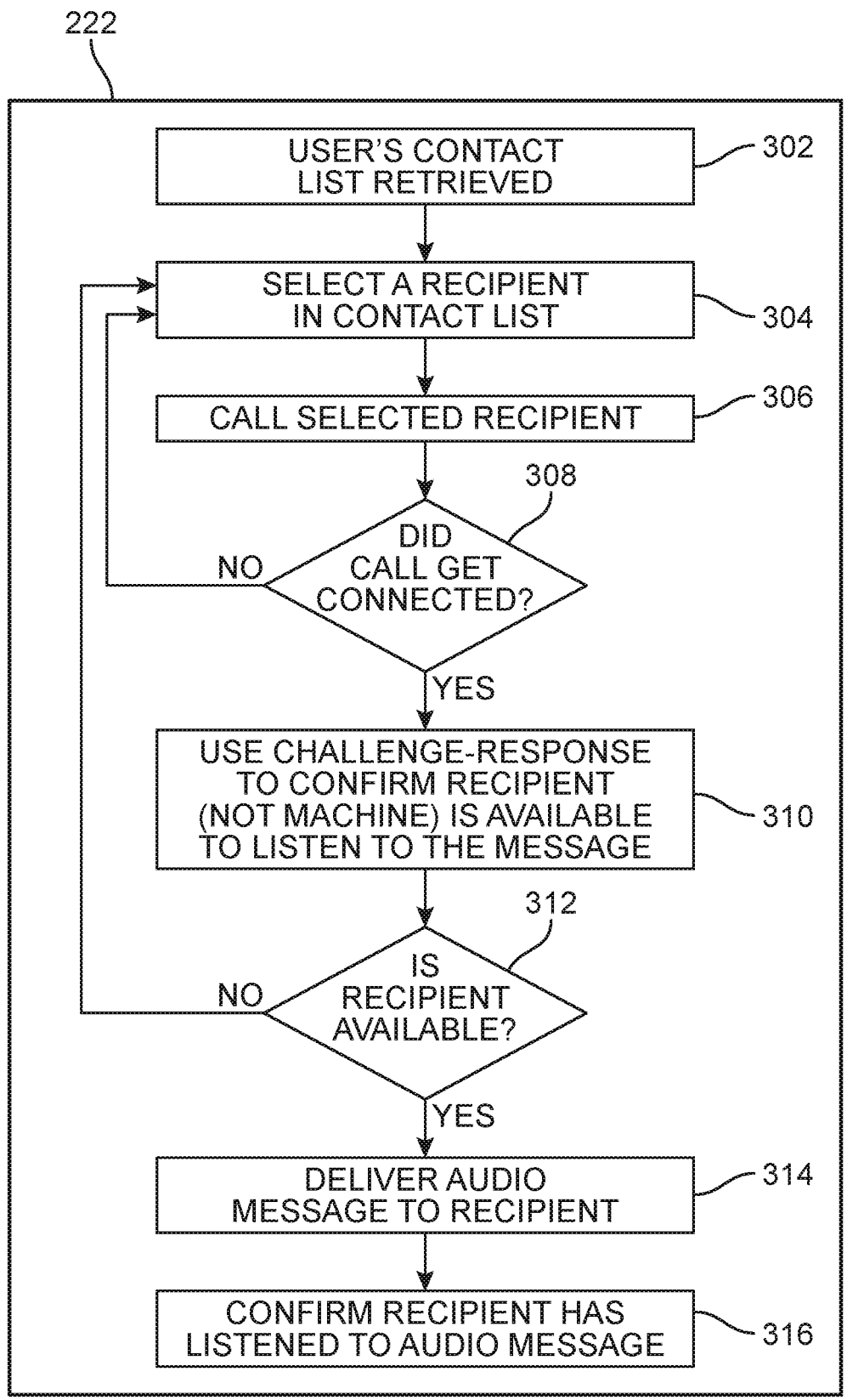
FIG. 3 is a schematic view of a sub-process of the process of FIG. 2, according to an embodiment.

FIG. 3 depicts a sub-process associated with step 222 in FIG. 2. Specifically, FIG. 3 depicts a set of steps that may be performed by dispatch system 201 in order to deliver an audio message to at least one recipient who is available. Once the user's contact list has been retrieved in step 302, dispatch system 201 may select one of the recipients in the contact last in step 304. In some embodiments, contacts may be ranked within a list so that dispatch system 201 selects first the contact with the highest ranking. For example, if the user is a student, the user may list his or her mother or father as the highest ranked contact. This would ensure that the dispatch system attempts to deliver the message to the student's parents before trying extended relatives and/or friends. In other cases, however, the first contact to be called may be selected randomly from a list of contacts.

In step 306, dispatch system 201 may call the selected recipient. In step 308, dispatch system 201 checks to determine if the call was connected. If the call failed to connect, dispatch system 201 may return to step 304 to select another recipient in the contact list. If the list is ranked, dispatch system 201 may select the next contact to call based on ranking. At this point the process repeats through step 304, step 306 and step 308 until the dispatch system is connected to one of the recipients.

Figure 4:
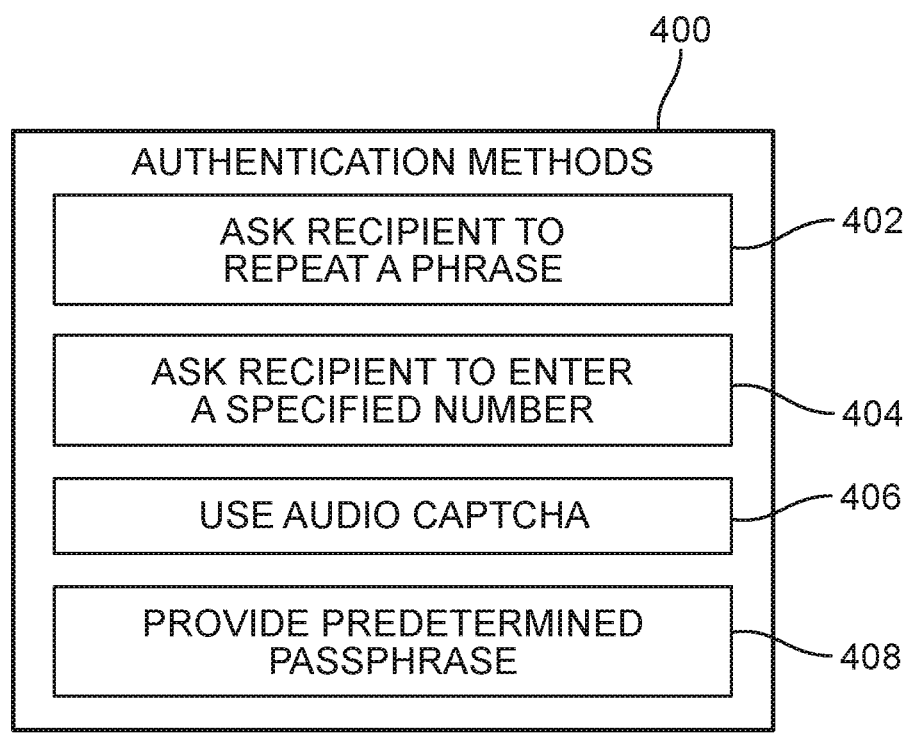
FIG. 4 is a schematic view of a set of authentication methods, according to an embodiment.
Figure 5:
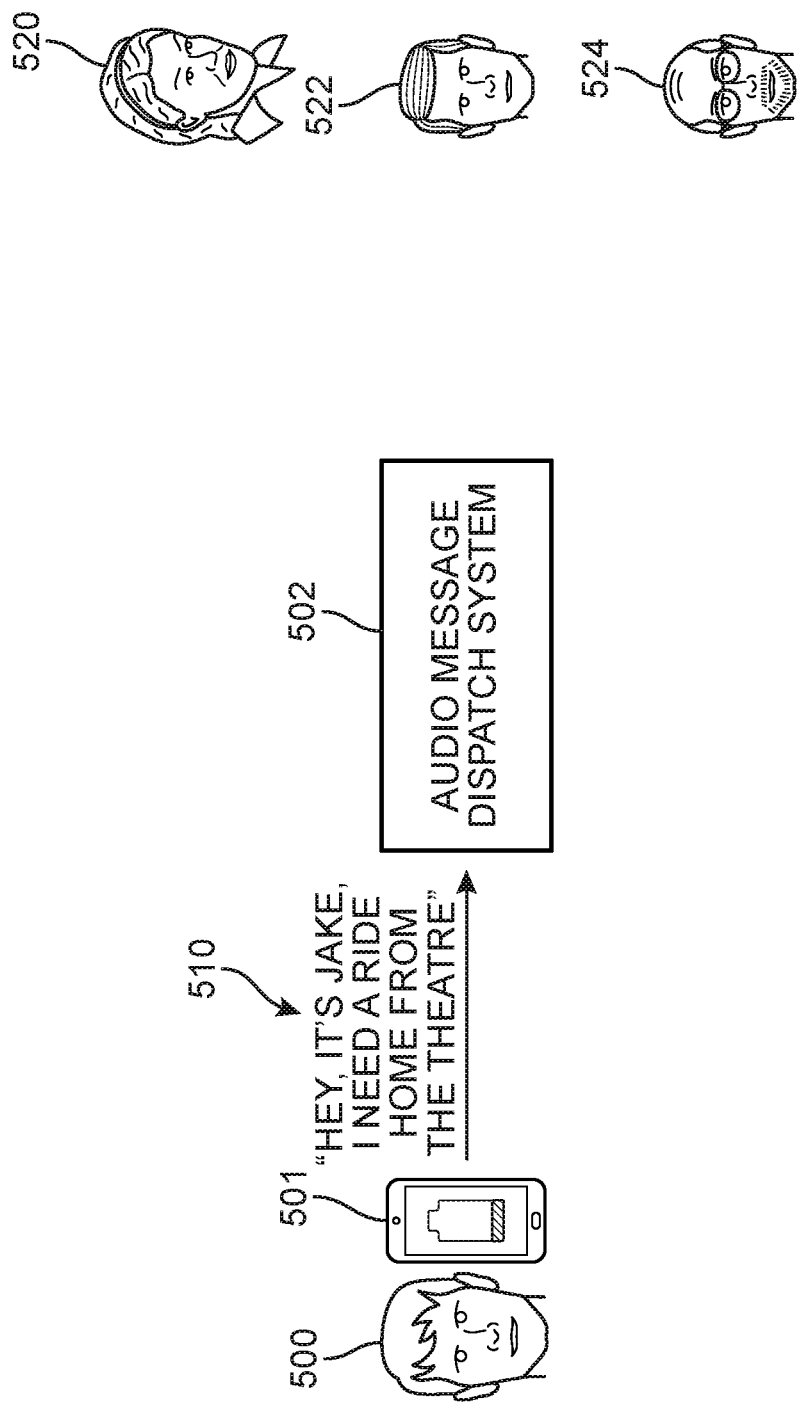
FIGS. 5-9 are schematic views of a dispatch message receiving an audio message and attempting to deliver the audio message to an available recipient, according to an embodiment.

In step 310, after a call is connected, dispatch system 201 may use a challenge-response type task to confirm that the recipient (and not a machine) is available to listen to the audio message immediately. Exemplary challenge-response type tasks are listed in FIG. 4 and may include, but are not limited to: asking a recipient to repeat a phrase 402, asking a recipient to enter a specified number 404, and/or using an audio CAPTCHA task 406. Here, "audio CAPTCHA" refers to a particular type of challenge-response task in which a participant is asked to discern a particular audible word or phrase from a distorted recording. Using an audio CAPTCHA may allow the system to confirm that the recipient is a person and not a bot or other automated system capable of providing simple responses.

In some embodiments, the challenge-response task may also be used to confirm that the person picking up the phone call is the selected recipient from the user's contact list and not another person with access to the same telephone/mobile line. In such embodiments, the challenge-response task could include asking the person on the phone to provide a predetermined passphrase 408 or other private information. By providing such information, the person would simultaneously indicate that they are not a machine and also that they are the intended recipient of the audio message.

In step 312, dispatch system 201 determines if the recipient (and not a machine) is available based on the challenge-response task provided in step 310. If the recipient is unavailable, dispatch system 201 may return to step 304 to select another recipient from the contact list. If, however, the recipient successfully completes the challenge-response task, dispatch system 201 proceeds to step 314 to deliver the audio message to the recipient.

Optionally, in some embodiments, the dispatch system could request that the recipient confirms that he or she has listened to the audio message in step 316, before hanging up. This could be done by having the recipient complete any of the previously discussed challenge-response tasks, or take any other action to indicate they've listened to the message.

FIGS. 5-9 depict schematic views of a scenario in which a user 500 has called an audio message dispatch system 502. In particular, user 500 is a teenager who needs a ride home from a movie theatre. User 500 has a cellular phone 501 with a very low battery. Therefore, user 500 will likely be unable to make many calls before their phone powers off. In this case, user 500 calls dispatch system 502 and leaves an audio message 510 indicating that they need a ride home from the theatre. Upon receiving (and storing) this message, dispatch system 502 begins trying to call the user's contact list, which has been previously provided to dispatch system 502. This list includes a first contact 520, a second contact 522, and a third contact 524.

Figure 6:
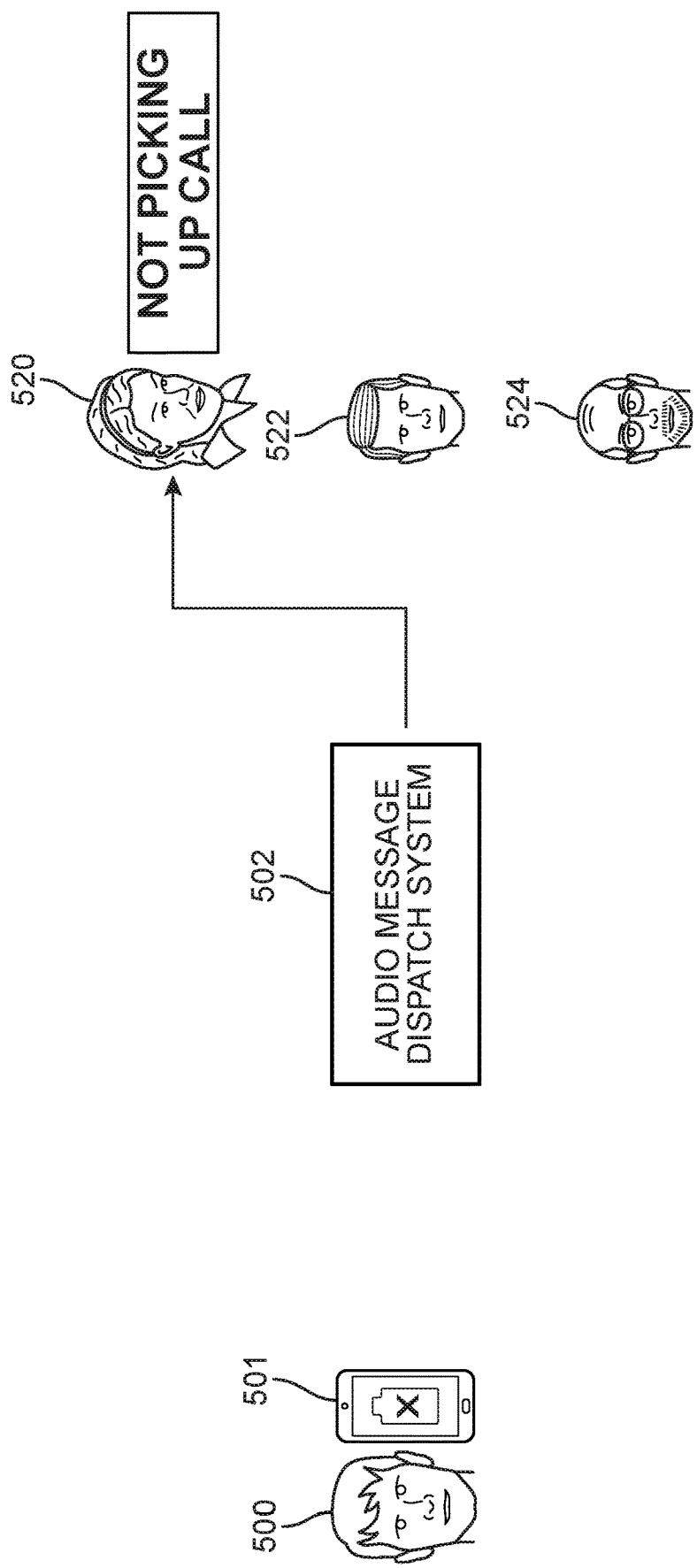
Figure 7:
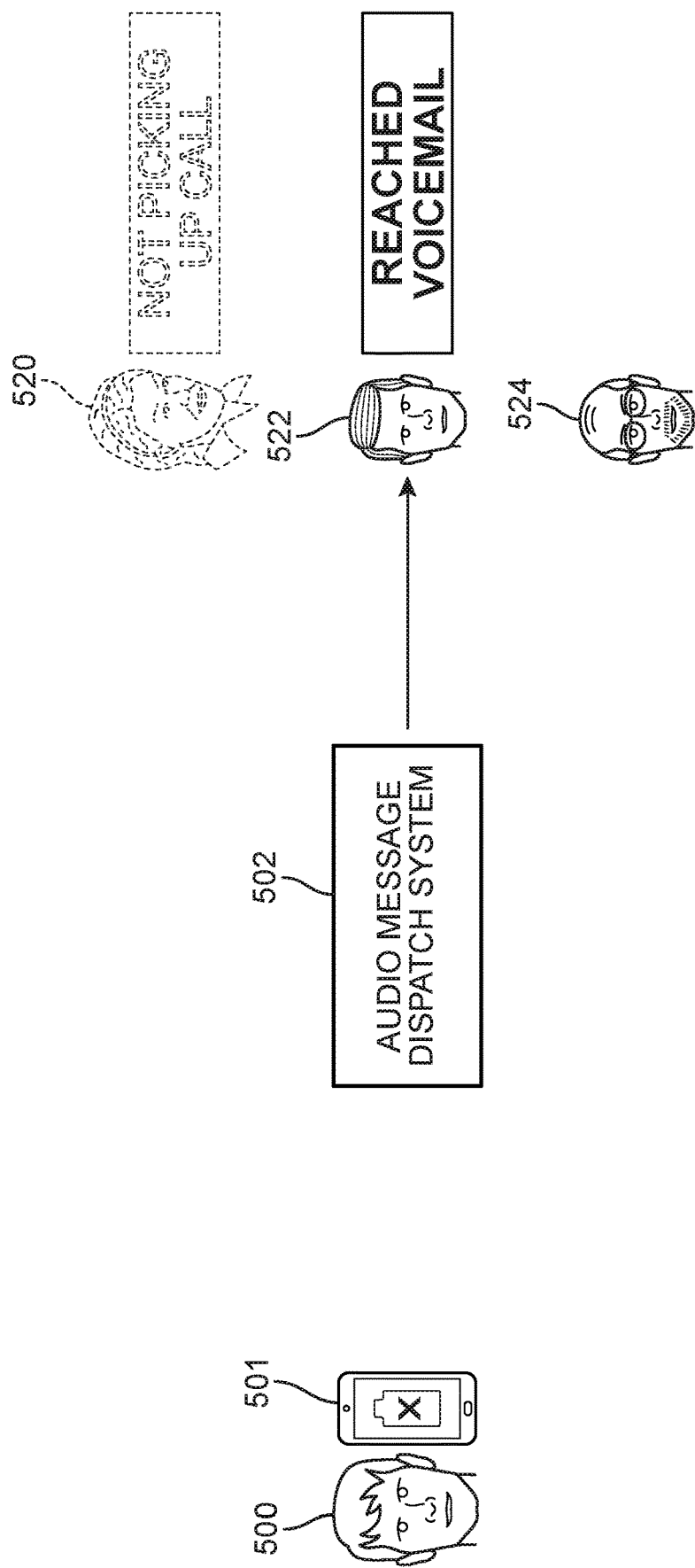
Figure 8:
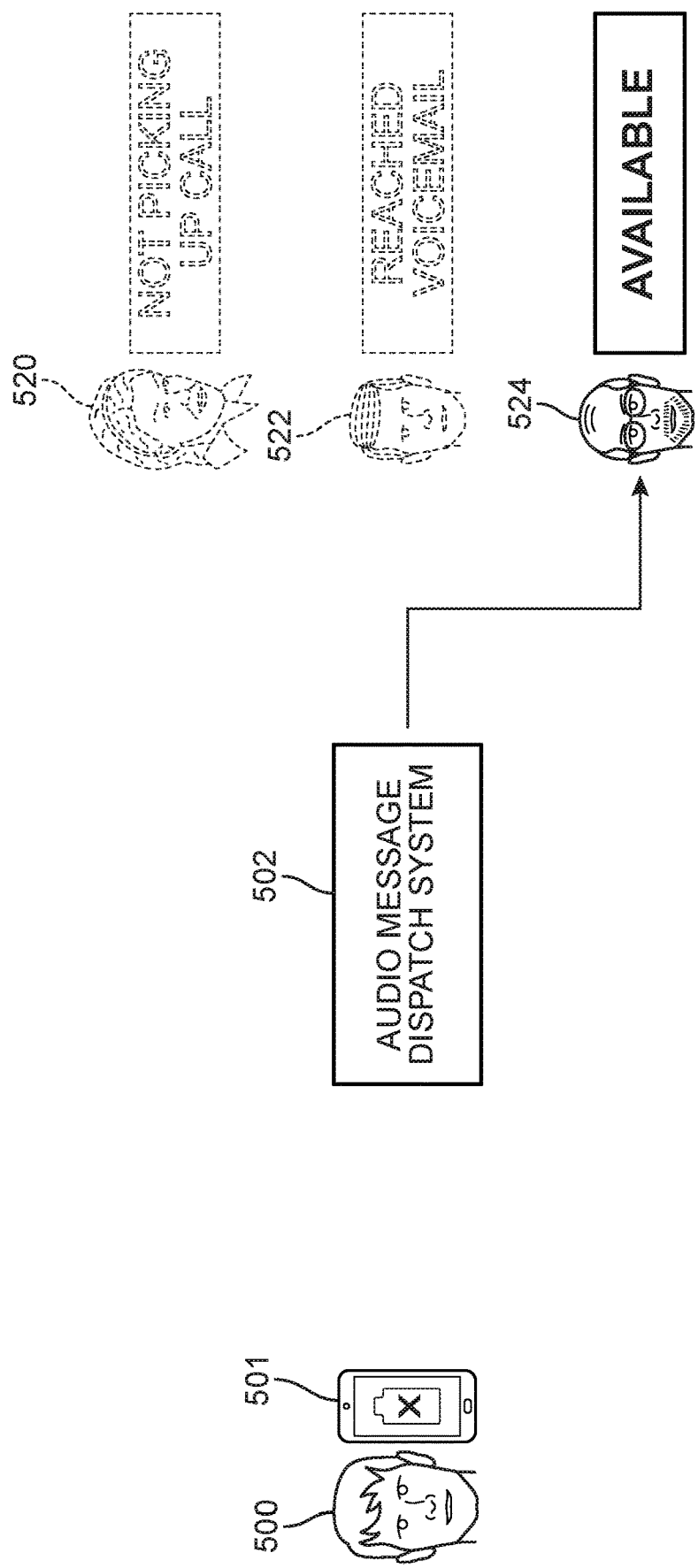
Figure 9:
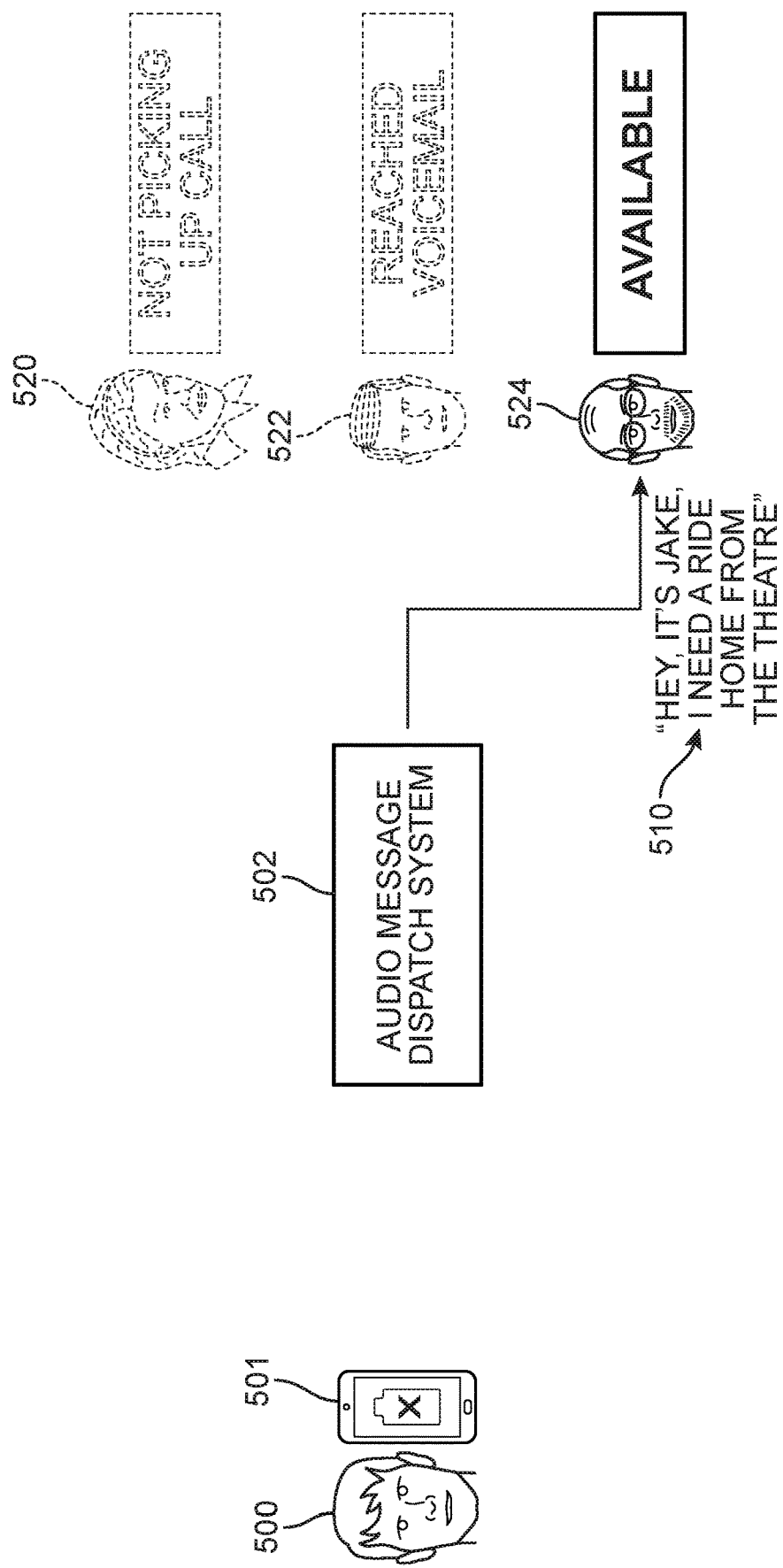

In FIG. 6, dispatch system 502 attempts to call first contact 520 who is not picking up their phone. Therefore, dispatch system 502 moves on to the next contact in the list. In FIG. 7, dispatch system 502 attempts to call second contact 522. The call is picked up, but by a voicemail system instead of a person. Following this, dispatch system 502 attempts to call third contact 524 who picks up the phone, as seen in FIG. 8. After identifying that the call has been picked up by a person (and not a machine), dispatch system 502 plays audio message 510 for third contact 524 as shown in FIG. 9.

Embodiments can include provisions for dispatching various other kinds of messages, including any kind of digital messages that include text, images, videos, and/or audio. In some cases, the digital messages could be SMS messages. SMS messages could be sent over any kind of telecommunications network, including a cellular network and/or the Internet.

Figure 10:
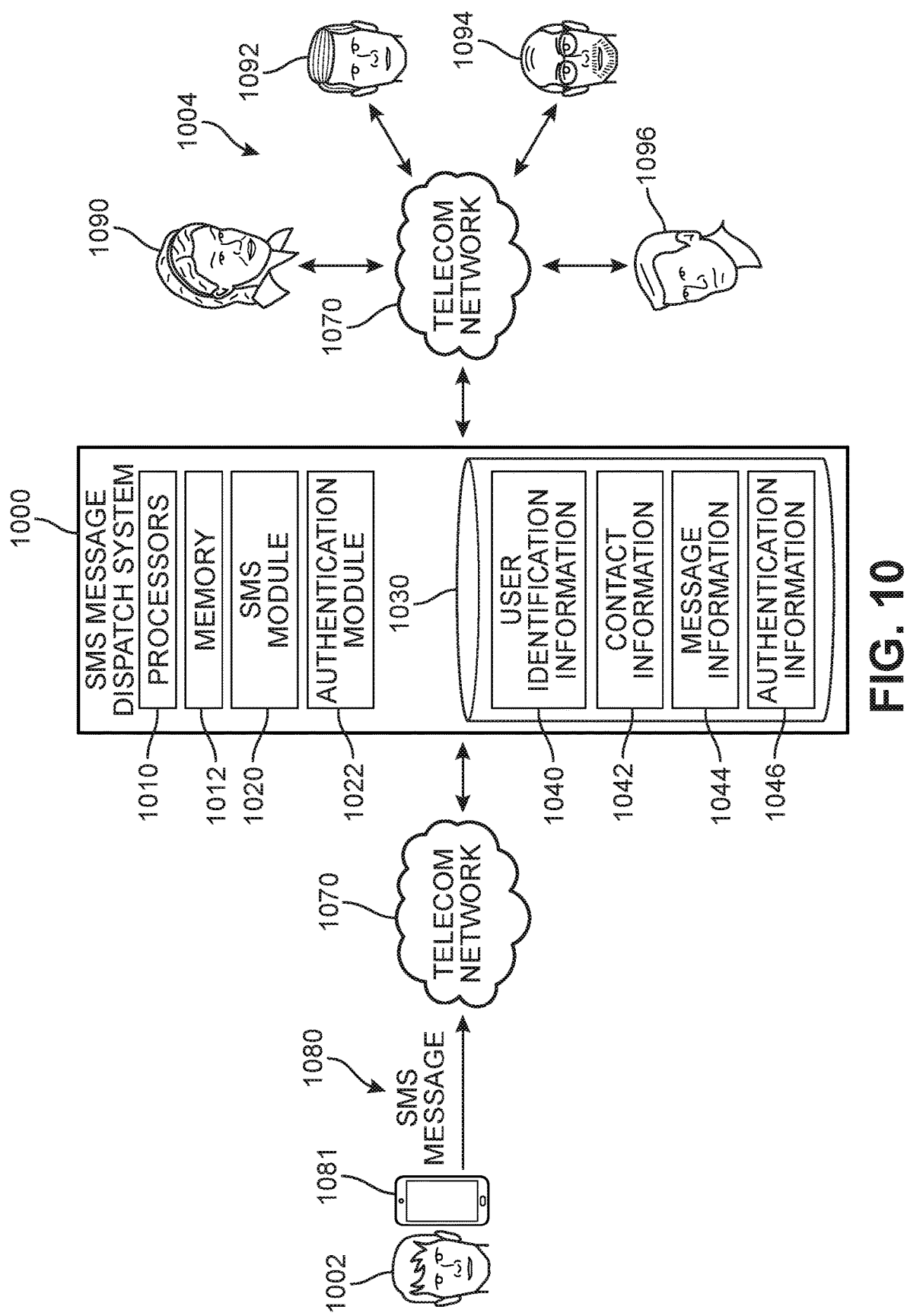
FIG. 10 is a schematic view of an SMS message dispatch system, according to an embodiment.

FIG. 10 is a schematic view of an embodiment of an SMS message dispatch system 1000. As seen in FIG. 10, SMS message dispatch system 1000 is in communication with a user 1002 and a network of message recipients 1004. SMS message dispatch system 1000, also referred to simply as dispatch system 1000, may comprise one or more computing systems including processors 1010 and memory 1012. Memory 1012 may comprise a non-transitory computer readable medium. Instructions stored within memory 1012 may be executed by the one or more processors 1010. As one example, dispatch system 1000 may comprise one or more servers running in the cloud.

Dispatch system 1000 is further comprised of an SMS module 1020 and an authentication module 1022. Additionally, dispatch system 1000 includes data storage 1030, which may be part of memory 1012. In other cases, data storage 1030 could be associated with a separate database.

SMS module 1020 is configured to receive texts from a user and send texts to one or more recipients. In addition, SMS module 1020 may be configured to receive and store various kinds of information. For each user of the system, SMS module 1020 stores user identification information 1040. User identification information can include a user's name, a user ID, or any other suitable personally identifying information. Associated with each user of the system is a list of contacts, which may be stored as contact information 1042.

SMS module 1020 may also store message information 1044. Message information may include text, audio, video and/or images left by a user of the system. Messages may be stored in any suitable format that can be sent when dispatch system 100 has reached someone on the user's list of contacts.

Authentication module 1022 is configured to authenticate that the recipient of a message is a person and not a machine. For example, authentication module 1022 may be configured to detect if a response send by a recipient is generated by a bot or other automated system. In some cases, authentication module 1022 may further include provisions for ensuring that a message is not only received, but also read and that any multimedia information is listened to and/or viewed.

Authentication module 1022 may use one or more kinds of authentication information 1046, which may be stored in data storage 1030. Authentication information 1046 can include any suitable information used by dispatch system 1000 to determine that the recipient of an SMS message is a person. In some cases, authentication information 1046 includes information pertaining to one or more kinds of challenge-response tasks that may be performed by authentication module 1022 to determine if the recipient is a person rather than a machine and/or to confirm that the recipient is currently available to view the message.

As seen in FIG. 10, dispatch system 1000 receives an incoming message from a user 1002. In this case, user 1002 has prepared a message on a smartphone 1081. User 1002 may send an SMS message 1080 to a number associated with dispatch system 1000 via telecommunications network 1070. In some cases, user 1002 may also provide user identification information along with the SMS message so that dispatch system 1000 knows which user is leaving a message and which network of recipients should be contacted.

FIG. 10 also depicts a network of recipients 1004 for the exemplary user 1002. This includes a set of contacts whom user 1020 has identified beforehand as suitable contacts to receive any messages. In this example, the contacts include a first recipient 1090 (the user's mother), a second recipient 1092 (the user's father), a third recipient 1094 (the user's grandfather), and a fourth recipient 1096 (the user's friend). Upon receiving a message from user 1002, dispatch system 1000 may begin sending messages to these recipients (using telecommunications network 1070) until an available recipient is found, as described in further detail below.

Figure 11:
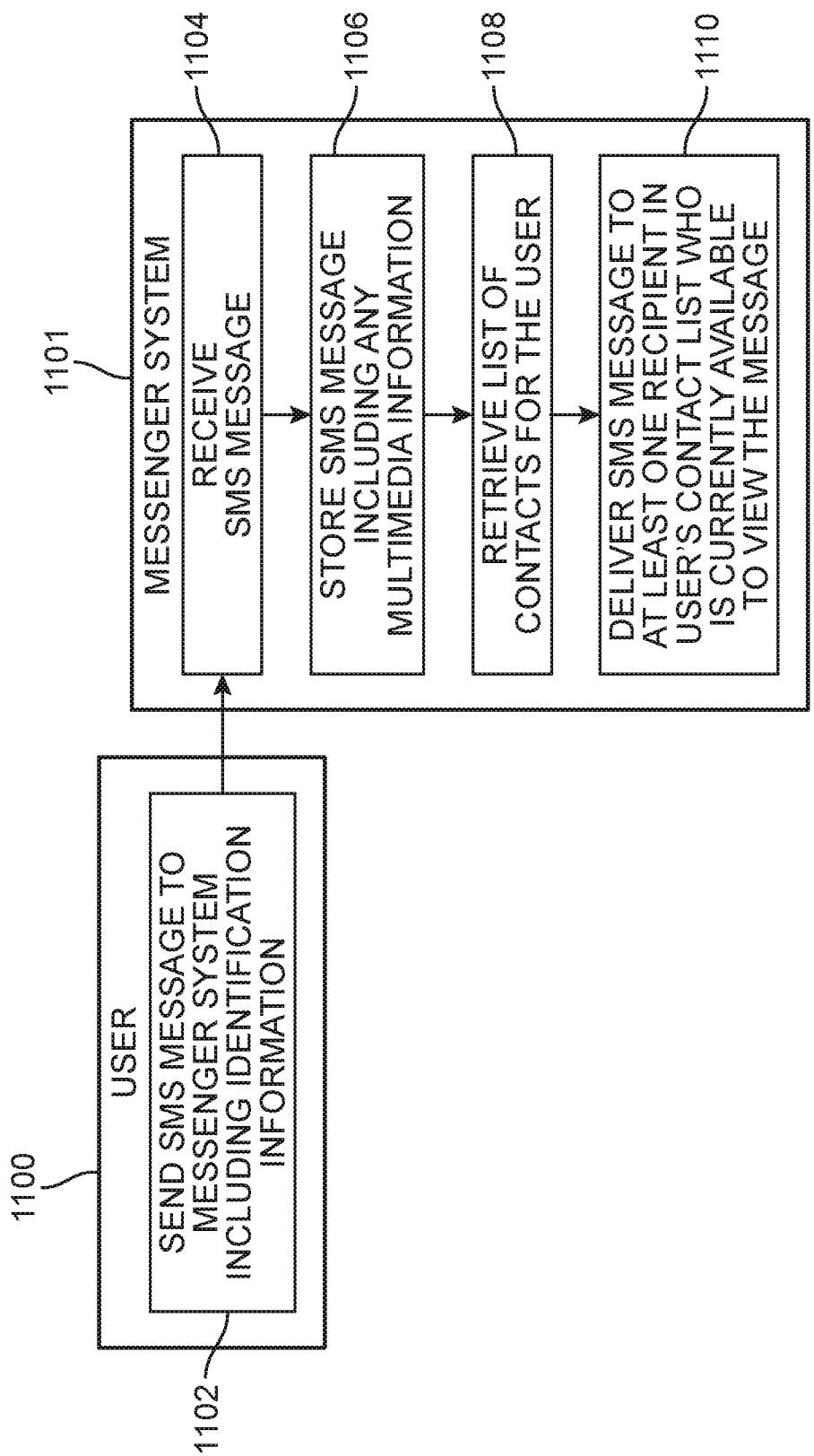
FIG. 11 is a schematic view of a process of dispatching an SMS message from a user to at least on recipient in a network of contacts, according to an embodiment.

FIG. 11 is a schematic view of a process of operating an SMS message dispatch system, according to an embodiment. As indicated in FIG. 11, some of the steps in this process may be performed by the user of the system (user 1100), while other steps may be performed by the dispatch system (dispatch system 1101).

Starting in step 1102, a user 1100 may send an SMS message to dispatch system 1101. Dispatch system 1101 receives the SMS message in step 1104. In some cases, dispatch system 1101 also receive separate user identification information. In other cases, user identification information can be inferred from the number used to send the message.

In step 1106, dispatch system 1101 stores the SMS message including any multimedia information (such as videos, audio clips and/or images). In step 1108, dispatch system 1101 retrieves a list of contacts for user 1100. In some cases, dispatch system 1101 uses the identification information to lookup the user and their associated contact list. In step 1010, dispatch system 1101 attempts to deliver the SMS message to at least one recipient in the user's contact list who is currently available to view to the message.

Figure 12:
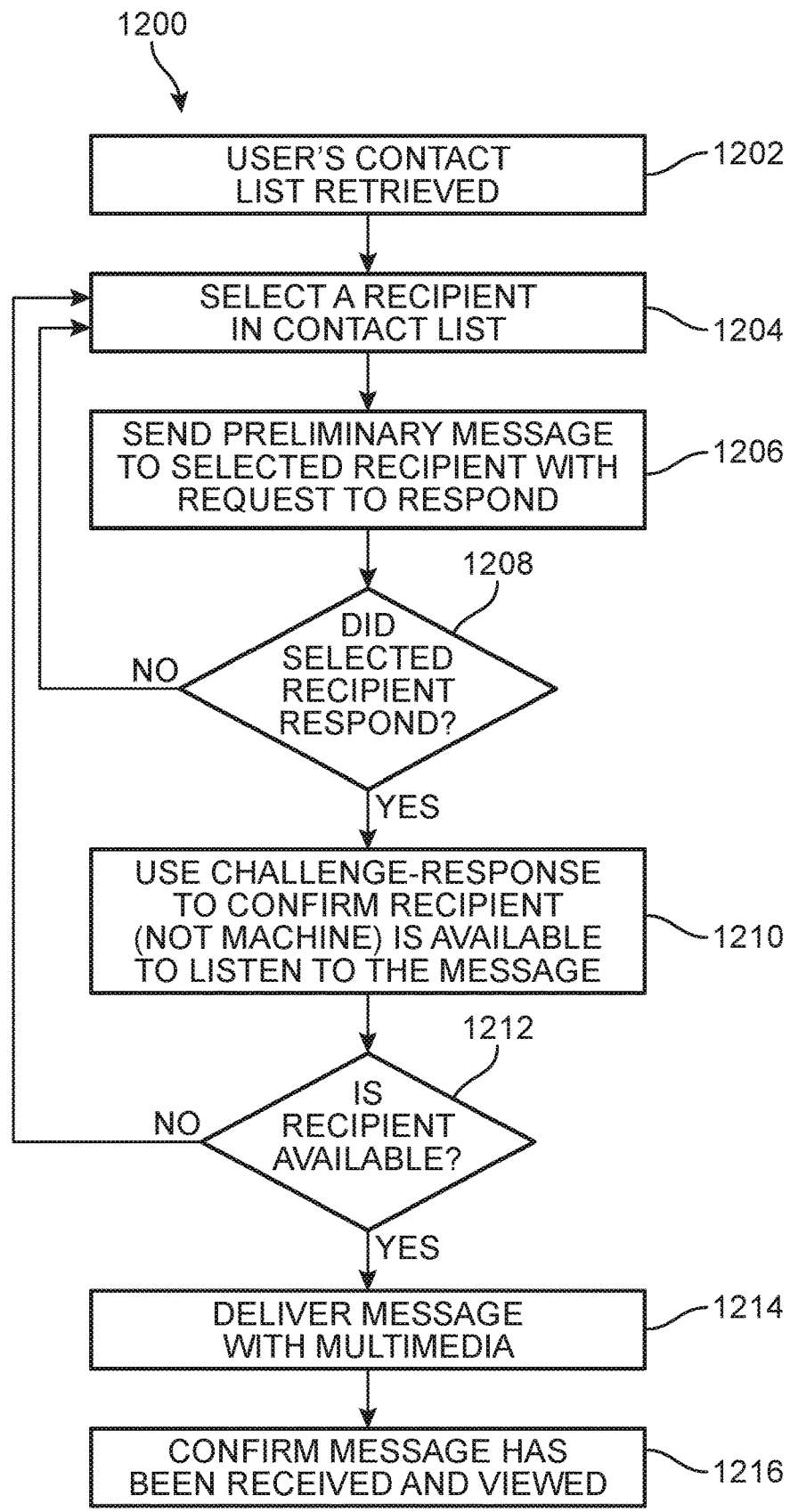
FIG. 12 is a schematic view of a sub-process of the process of FIG. 11, according to an embodiment.

FIG. 12 depicts a sub-process 1200 associated with step 1110 in FIG. 2. Specifically, FIG. 12 depicts a set of steps that may be performed by dispatch system 1101 in order to deliver an SMS message to at least one recipient who is available. Once the user's contact list has been retrieved in step 1202, dispatch system 1101 may select one of the recipients in the contact last in step 1204. In some embodiments, contacts may be ranked within a list so that dispatch system 1101 selects first the contact with the highest ranking. For example, if the user is a student, the user may list his or her mother or father as the highest ranked contact. This would ensure that the dispatch system attempts to deliver the message to the student's parents before trying extended relatives and/or friends. In other cases, however, the first contact to be texted may be selected randomly from a list of contacts.

In step 1206, dispatch system 1101 may send a preliminary message to the selected recipient with a request to respond. As determined in step 1208, if the recipient fails to respond to the preliminary message, system 1101 may return to step 1204 to select another recipient in the contact list. In some cases, dispatch system 1101 may wait a predetermined time (for example, 5 minutes) before selecting another recipient. At this point the process repeats through step 1204, step 1206 and step 1208 until a recipient responds to the preliminary message to indicate they are available.

In step 1210, after a response is received, dispatch system 1101 may use a challenge-response type task to confirm that a person (and not a machine) is available to read to the SMS message immediately. Exemplary challenge-response type tasks may include responding with answers to straightforward questions, image CAPTCHA tasks, or other suitable tasks.

In some embodiments, the challenge-response task may also be used to confirm that the person responding to the preliminary text is the selected recipient from the user's contact list and not another person with access to intended recipient's devices. In such embodiments, the challenge-response task could include asking the person to provide a predetermined password or other private information. By providing such information, the person would simultaneously indicate that they are not a machine and also that they are the intended recipient of the SMS message.

If the recipient is determined to be unavailable in step 1212 based on the challenge-response task provided in step 1210, dispatch system 1101 may return to step 1204 to select another recipient from the contact list. If, however, the recipient successfully completes the challenge-response task, dispatch system 1101 proceeds to step 1214 to deliver the SMS message to the recipient.

Optionally, in some embodiments, the dispatch system could request that the recipient confirms that he or she has read the SMS message (including watching and/or listening to any multimedia attachments) in step 1216.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of sending audio messages over a telecommunications network, the method comprising:
   receiving a call from a user;
   requesting user identification information from the user;
   receiving the requested user identification information from the user;
   recording an audio message from the user;
   retrieving a list of contacts associated with the user identification information;
   automatically calling a first recipient from the list of contacts;
   determining that the first recipient is not available to immediately receive the audio message, wherein determining that the first recipient is not available to immediately receive the audio message further includes:
      determining that the call to the first recipient has been connected;
      requesting that the first recipient perform a task; and
      determining that the first recipient has failed to perform the task;
   after determining that the first recipient is not available to immediately receive the audio message, automatically calling a second recipient from the list of contacts; and
   determining that the second recipient is available to immediately receive the audio message; and
   upon the determining that the second recipient is available to immediately receive the audio message, delivering the audio message to the second recipient.

2. The method according to claim 1, wherein the telecommunications network is a telephone network.

3. The method according to claim 1, wherein the user identification information includes at least a name.

4. The method according to claim 1, wherein the user identification information includes at least a phone number.

5. The method according to claim 1, wherein the determining that the second recipient is available to immediately receive the audio message further includes:
   determining that the call to the second recipient has been connected;
   requesting that the second recipient perform a task; and
   determining that the second recipient has performed the task.

6. The method according to claim 1, wherein the task includes repeating a phrase.

7. The method according to claim 1, wherein the task includes entering a specified number using a phone.

8. The method according to claim 1, wherein the task includes solving an audio CAPTCHA problem.

9. A method of sending short message service messages over a telecommunications network, the method comprising:

receiving a short message service (SMS) message from a user, wherein: the SMS message includes user identification information; and
the SMS message includes text; retrieving a list of contacts associated with the user identification information;
automatically sending a first preliminary message to a first recipient from the list of contacts;
determining that the first recipient is not available to immediately view the SMS message, wherein determining that the first recipient is not available to immediately view the SMS message further includes:
requesting that the first recipient perform a task; and
determining that the first recipient has failed to perform the task;
after determining that the first recipient is not available to immediately view the SMS message, automatically sending a second preliminary message to a second recipient from the list of contacts; and
determining that the second recipient is available to immediately view the SMS message;
upon the determining that the second recipient is available to immediately view the SMS message, delivering the SMS message to the second recipient.

10. The method according to claim 9, wherein the task includes solving an image CAPTCHA problem.

11. The method according to claim 9, wherein the SMS message includes multimedia information.

12. The method according to claim 9, wherein the determining that the second recipient is available to immediately view the SMS message further includes:
requesting that the second recipient perform a task; and
determining that the second recipient has performed the task.

13. The method according to claim 9, wherein the task includes answering a question.

14. A message dispatch system for delivering messages to users over a telecommunications network, comprising:
a device processor; and
a non-transitory computer readable medium storing instructions that are executable by the device processor to implement:
a messaging module that is configured to automatically dispatch a user supplied message to recipients in a user's contact list; and
an authentication module that is configured to automatically determine if a recipient is available to receive the user supplied message, wherein the authentication module is configured to determine if the recipient is available by asking the recipient to perform a challenge-response task;
wherein the authentication module is further configured to:
automatically call a first recipient from the recipients in the user's contact list;
determine that the first recipient is not available to immediately receive the user supplied message,
wherein determining that the first recipient is not available to immediately receive the user supplied message further includes:
determining that the call to the first recipient has been connected;
requesting that the first recipient perform the challenge-response task; and
determining that the first recipient has failed to perform the challenge-response task;
after determining that the first recipient is not available to immediately receive the user supplied message, the authentication module is configured to automatically call a second recipient from the recipients in the user's contact list; and
determine that the second recipient is available to immediately receive the user supplied message; and
upon the determining that the second recipient is available to immediately receive the audio message, the authentication module is configured to deliver the user supplied message to the second recipient.

15. The message dispatch system according to claim 14, wherein the user supplied message is an audio message.

16. The message dispatch system according to claim 14, wherein the challenge-response task is to ask the recipient to enter a specified number.

17. The message dispatch system according to claim 14, wherein the challenge-response task is to ask the recipient to repeat a phrase.

18. The message dispatch system according to claim 14, wherein the messaging module is further configured to send text messages to one or more recipients in the user's contact list.

19. The message dispatch system according to claim 18, wherein the messaging module sends a preliminary message to each recipient in the user's contact list to determine if the recipient is available to immediately view the user supplied message before delivering the user supplied message to the recipient.

20. The message dispatch system according to claim 14, wherein the messaging dispatch system includes a database for storing user identification information that is used to identify a user calling in with a message.

* * * * *